United States Patent [19]

Willard et al.

[11] 4,419,375
[45] Dec. 6, 1983

[54] PROCESS FOR FORMING A POTATO PATTY

[75] Inventors: Miles J. Willard, P.O. Box 2774, Idaho Falls, Id. 83401; William J. Englar, Moses Lake, Wash.

[73] Assignee: Miles J. Willard, Idaho Falls, Id.

[21] Appl. No.: 339,328

[22] Filed: Jan. 15, 1982

Related U.S. Application Data

[63] Continuation of Ser. No. 130,600, Mar. 17, 1980, abandoned, which is a continuation-in-part of Ser. No. 84,447, Oct. 12, 1979, abandoned, which is a continuation of Ser. No. 962,899, Nov. 22, 1978, abandoned, which is a continuation of Ser. No. 871,150, Jan. 20, 1978, abandoned.

[51] Int. Cl.³ .............................................. A23L 1/216
[52] U.S. Cl. .................................... 426/272; 426/438; 426/441; 426/637; 426/808
[58] Field of Search .............. 426/272, 637, 438, 441, 426/509, 510, 511, 518, 519, 520, 524, 512, 388, 808

[56] References Cited

U.S. PATENT DOCUMENTS

| | | |
|---|---|---|
| 3,021,223 | 2/1962 | Eskew ................................. 426/637 |
| 3,399,062 | 8/1968 | Willard, Jr. et al. |
| 3,410,702 | 11/1968 | Frank ................................. 426/272 X |
| 3,751,268 | 8/1973 | Van Patten et al. |
| 3,830,949 | 8/1974 | Shatila ............................... 426/637 X |
| 3,968,265 | 7/1976 | Shatila et al. ...................... 426/637 X |
| 3,975,549 | 8/1976 | Shatila et al. ...................... 426/637 X |
| 3,987,210 | 10/1976 | Cremer. |
| 3,988,484 | 10/1976 | Shatila ............................... 426/637 X |
| 3,997,684 | 12/1976 | Willard ............................... 426/637 X |
| 4,007,292 | 2/1977 | Shatila et al. ...................... 426/637 |
| 4,109,024 | 8/1978 | Cremer. |
| 4,135,004 | 1/1979 | Finkel ................................ 426/637 X |
| 4,198,437 | 4/1980 | Citti et al. ......................... 426/637 X |
| 4,276,314 | 6/1981 | Andersen ............................ 426/272 |

FOREIGN PATENT DOCUMENTS

| | | |
|---|---|---|
| 2062481 | 11/1970 | Fed. Rep. of Germany. |
| 1316474 | 10/1970 | United Kingdom. |
| 1509721 | 4/1975 | United Kingdom. |

*Primary Examiner*—Arthur L. Corbin
*Attorney, Agent, or Firm*—Christie, Parker & Hale

[57] ABSTRACT

A potato patty is made from cooked or blanched shredded potatoes and a natural potato binder. The binder is made from cooked or blanched potatoes in which the gelatinized starch naturally present in the potatoes is extensively retrograded either by holding the potatoes at a temperature of about 50° F. for at least about 16 hours, or at lower temperatures for proportionately shorter holding times, or by freezing the potatoes. The potatoes used in preparing the binder are subdivided, preferably comminuted to a fine particle size either before or after the starch is retrograded. Between about 10 to about 50 parts of binder are mixed with about 100 parts of the potato shreds, by weight, and a potato patty is formed from the mixture, preferably in a high-speed commercial former. Retrogradation of the amylose component of the starch naturally present in the potato binder reduces the solubility of the starch to minimize adhesiveness of the binder sufficiently that the binder can be mixed uniformly and completely with the shreds during forming without damaging the shreds. This provides a cohesive potato patty that can be deep-fat fried, without separating in the fryer. The previously retrograded amylose in the binder re-solubilizes at the moment of frying to form a thin exterior film on the patty that inhibits penetration of fat. The fried patty can be frozen and later reheated or fried by conventional means. When reheated in a household pop-up toaster, oil drip in the toaster is minimized.

30 Claims, 1 Drawing Figure

PROCESS FOR FORMING A POTATO PATTY

CROSS-REFERENCE TO RELATED APPLICATIONS

This application is a continuation of Ser. No. 130,600, filed Mar. 17, 1980, now abandoned, which, in turn, is a continuation-in-part of application Ser. No. 084,447, filed Oct. 12, 1979, abandoned, which, in turn, is a continuation of application Ser. No. 962,899, filed Nov. 22, 1978, abandoned, which, in turn, is a continuation of application Ser. No. 871,150, filed Jan. 20, 1978, abandoned, and these applications are incorporated herein by this reference.

BACKGROUND OF THE INVENTION

This invention relates to production of a convenience potato product in which a natural potato binder is added to discrete particles of potato tissue to hold such particles together when formed into convenient shapes. The binder is particularly useful in holding together long, thin shreds of pre-cooked potatoes, in the form commonly known as hash brown potatoes so the shreds can be formed into patties and deep-fat fried without falling apart during frying. The patties can be frozen and later prepared for institutional use by deep-fat frying or oven heating and for retail use by oven heating, pan frying, or pre-heating in a common household pop-up toaster.

It has long been known that cooked potatoes, which have been cooled to reduce stickiness of the starch present in the potatoes, can be shredded, and the shreds then formed into a thin layer or patty and fried on a grill to form hash brown potatoes, as they are called in the Unites States, or Roesti, as they are known in Europe.

In the manufacture of hash brown potatoes for use in restaurants, small potatoes are peeled and cooled for a period of 24 to 48 hours at about 50° F. (10° C.). After this time, the starch in the potatoes has been reduced in stickiness to facilitate shredding. The potatoes are shedded, packaged, and stored under refrigeration until used, normally within seven days. The shreds are commonly fried on a greased griddle, and approximately five minutes are required for frying each side of the hash brown patty in bulk. Portion control is difficult, and considerable product is wasted if not used soon after frying.

Frozen hash brown potatoes have been developed to produce a more stable hash brown product. Small whole potatoes or sliced potatoes ½ to ⅝-inch (12.7 to 15.9 mm) thick are cooked until edible but still firm and cooled to an internal temperature of about 40° F. to 70° F. (4° C. to 21° C.). The potatoes are shredded, molded into a mass about ½ to ⅝-inch (12.7 to 15.9 mm) thick, scored into portions about 3 × 4 inches (76 × 102 mm) to provide convenient serving size, and then frozen. After freezing, the molded, scored blocks are packaged in bulk. For restaurant preparation individual patties are broken from the rectangular block and the finished product is fried on a griddle. The individual frozen patties are fried on the griddle at least five minutes on each side to brown them sufficiently and to thaw and heat the center. It would be desirable to reduce this frying time by deep-fat frying the patties about two to four minutes, or less. However, the potato patties described above cannot be deep-fat fried, either before freezing or for final preparation, because the shreds separate in the fryer and pick up excessive fat.

Various methods for preparing hash brown potatoes have been disclosed in the prior art. U.S. Pat. No. 2,748,814 to Rivoche describes a method for making frozen food patties in which the comminuted food particles are coated with an edible cellulose gum which gels when heated to hold potato particles together. The same thermal binding system is described in U.S. Pat. No. 3,399,062 to Willard et al for binding dehydrated potatoes and water to form a mash that is formed into shapes such as french fried potatoes. Use of such binders produces an unnatural texture or mouth feel, when compared with traditional hash brown potatoes, and as a result, the process has not become comercially significant.

U.S. Pat. No. 3,410,702 to Frank describes a process for adding a riced, dehydrated potato to dehydrated diced potatoes for subsequent rehydration and use for making hash brown potatoes by frying on an oiled grill. The reconstituted riced potatoes contain sufficient free amylose to hold together the reconstituted diced potatoes while they are fried. *Potato Processing*, Edition 1, 1959, page 446, also discloses addition of dehydrated starches of potatoes to mixtures of shredded pieces of dehydrated potatoes to hold them together while fried in a similar manner. The binder in the Frank process contains sufficient soluble amylose, i.e., amylose that is sticky or adhesive enough to bind together the reconstituted potato pieces. The product of the Frank patent is not shaped, but is fried in a random manner on a grill, and is not deep-fat fried.

The present invention provides a method for preparing a natural potato binder that can be mixed with potato shreds to form a potato patty that is capable of being deep-fat fried to form hash brown potato patties on a commercial production basis. In addition to providing hash brown potato patties that hold together in their formed shape during deep-fat frying, this binder makes it possible to form shredded potato patties on a production basis in a high-speed commercial former. It has also been discovered that the binder provides a potato patty that resists excessive fat penetration during deep-fat frying. The barrier provided by the binder also is effective in reducing fat drip upon reheating the potato by toaster preparation.

SUMMARY OF THE INVENTION

Briefly, a natural potato binder of subdivided potato tissue, in which the amylose component of the starch has been retrograded, is mixed with potato shreds or strips. The binder makes it possible to effectively mold the shreds into patties that can be prepared by deep-fat frying. The potato tissue used for the binder is initially heated sufficiently to inactivate enzymes and gelatinize the starch naturally present in the potatoes. The potatoes are then cooled or frozen to retrograde the amylose component of the starch in the potatoes. Such retrogradation reduces the solubility of the amylose fraction of the starch sufficiently to appreciably reduce the viscosity and the normal sticky character of the subdivided potato tissue. The starch can be retrograded sufficiently by holding cooled or blanched potatoes at a temperature of about 50° F. for at least about 16 hours, or at lower temperatures for proportionately lower holding times, or by freezing the potatoes. The retrograded potato material is then mixed with potato shreds to form a potato patty. Because of the retrogradation of the starch, the binder can be spread uniformly throughout and between the elongated potato shreds, filling the interstices between shreds during mixing and forming without damaging the long, thin shreds. As a result of the intricate mixing of the retrograded binder with the shreds of the potato patty, the patty can maintain its shape during deep-fat frying, whether or not the patty is frozen prior to frying. During frying the retrograded amylose in the binder increases in temperature at the outer surface of the patty sufficiently to increase its water-solubility and form an essentially continuous film around the exterior of the patty. This film of resolubilized amylose maintains the shape of the patty during frying, and in addition provides as an effective fat barrier that reduces fat uptake during frying and reduces fat drip during subsequent toaster preparation.

These and other aspects of the invention will be more fully understood by referring to the following detailed description and the accompanying drawing.

DETAILED DESCRIPTION

According to one practice of the invention, potato shreds are formed by peeling raw potatoes, slicing the potatoes, and then heat-treating the slices sufficiently to inactivate enzymes and gelatinize the starch naturally present in the potatoes. Such heat treatment can be provided by cooking or blanching the potato slices as described in more detail below. The heat-treated potato slices are then cooled to reduce the stickiness of the gelatinized starch present in the potatoes. The potatoes are then shredded by subdividing them into long, thin discrete shreds or strips. A typical shred can measure about 1/16-inch thick and from about ½ to 2-inches long, depending upon the size of potatoes being processed.

Briefly, the natural potato binder is formed from raw peeled potatoes that are (1) heat-treated to inactivate enzymes and gelatinize the starch present in the potatoes; (2) cooled (after heat-treating) at a temperature of about 50° F. for at least about 16 hours, or cooled at lower temperatures above freezing of the water in the potatoes (from above 32° F. up to 50° F.) for proportionately shorter holding times, or frozen, to retrograde the amylose fraction of the starch naturally present in the potatoes; and (3) subdivided into a much finer particle size than the discrete shreds.

Figure 1:
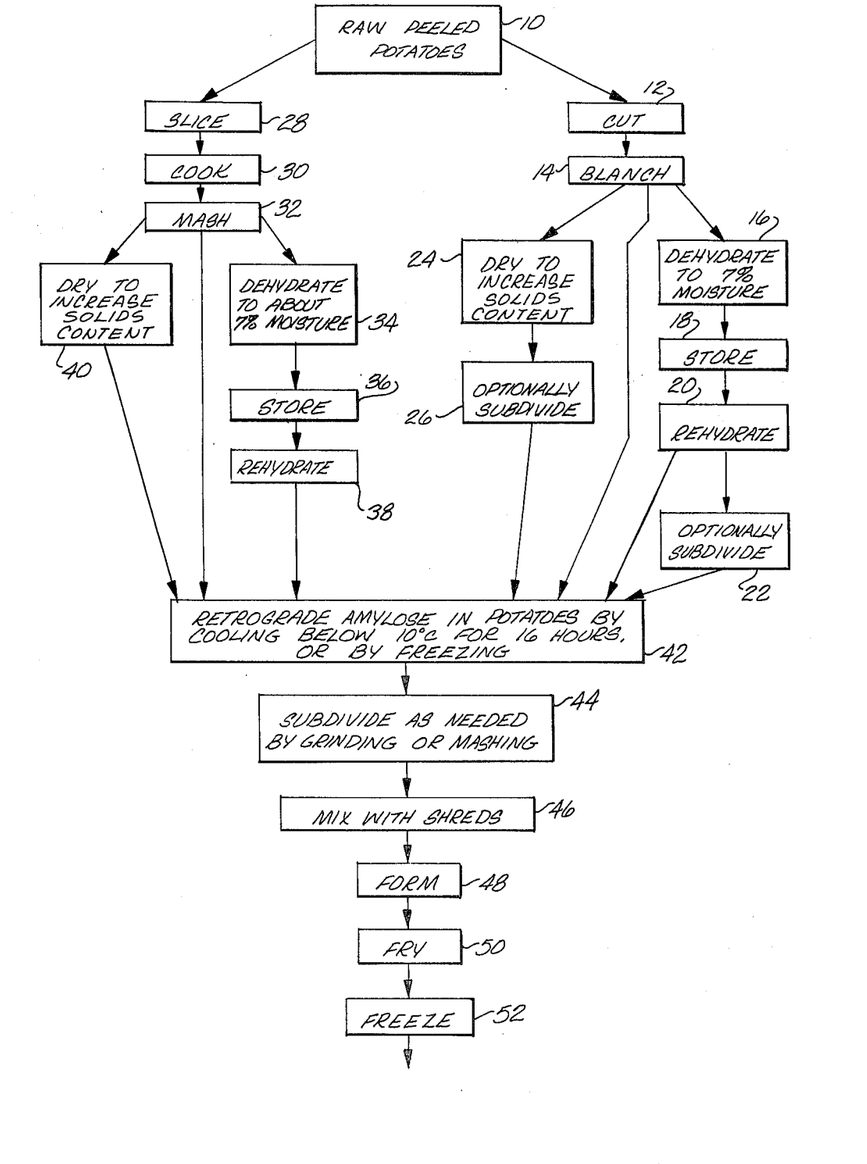
The drawing illustrates alternative methods of treatment for raw or dehydrated potatoes for forming a binder according to principles of this invention.

The drawing shows various alternative methods of treatment for raw or dehydrated potatoes that can be used to prepare the retrograded natural potato binder. Referring to the drawing, raw peeled potatoes 10 are cut into slices at 12. The potatoes can be cut into slices approximately ½-inch thick. The slices are then subjected to heat-treatment by blanching at 14 to inactivate enzymes and gelatinize the starch present in the potatoes. The potato slices are sufficiently blanched by heat-treating them in water held at about 165° F. to 180° F. for about 15 to 20 minutes. By the term "blanching" is meant heating the potato tissue to an internal temperature of from about 165° F. to 180° F. for a period of time sufficient for the potatoes to reach this internal temperature. Heat-treating the potatoes to an internal temperature of about 165° to 180° gelatinizes the starch naturally present in the potatoes and inactivates substantially all enzymes in the potatoes.

The blanched potato slices then can be subjected to various processing alternatives prior to retrogradation. For example, in one method of processing, the potatoes can be dehydrated by standard means at 16 to a moisture content of about 7%. The dried pieces then can be stored indefinitely at 18 for future use as needed. The dried pieces can later be rehydrated at 20 by mixing them with a sufficient amount of water to increases their total solids content to a range of from about 20% to about 35% by weight. The potatoes can be optionally subdivided by a grinding step 22 prior to subsequent retrogradation.

In an alternative method of processing, the blanched potato slices can be dried at 24 to a solids content of about 20% to 35% by weight by drying them at 300° F. for a period of about 10 minutes. The pre-dried potato slices can be optionally subdivided by a grinding or hammer-milling step 26 to form a binder.

In the subdividing steps described herein the potatoes can be ground or hammer-milled. The Urschel Laboratories Comitrol grinder provides cutting heads of a size small enough to effectively rupture most of the potato cells during grinding, releasing the starch from them. The binder can be ground to pass a 0.032-inch opening or smaller. With a larger opening, more binder is needed to mix with a given amount of shreds. The preferred 0.015-inch cutting head uniformly comminutes the blanched potatoes to form a fluid mass of fine particulate potato material somewhat resembling mashed potatoes in appearance. Alternatively, a Rietz hammer-mill fitted with a 0.032-inch conidure screen can be used to form the binder in this process.

As another alternative, the potato slices that have been blanched can be retrograded directly without the predrying or subdividing steps described above. The blanched potato slices in this instance can be cooled at about 50° F. A preliminary washing in cold tap water can be used to partially reduce the temperature of the potato slices before they are refrigerated.

The binder also can be prepared from cooked potatoes. By "cooking" potatoes is meant heating the potatoes to approximately 200° F. to 212° F. internal temperature for a period of time sufficient to soften the potatoes so that they can be processed by mashing to form mashed potatoes of uniform consistency. Potatoes can vary widely in the degree of heat treatment needed to become cooked. In a preferred practice, the raw, peeled potatoes 10 are cut into slices approximately ½-inch thick at 28. The slices are then cooked at 30 and thereafter mashed at 32. The resulting mashed potatoes have a moisture content of about 80% by weight. The mashed potatoes then can be subjected to one optional process in which they are dehydrated at 34 to a moisture content of about 7%, after which the dehydrated mashed potatoes can be stored indefinitely until needed. The dehydrated mashed potatoes can be rehydrated at 38 to form a binder having a solids content in the range of about 20% to about 35% by weight.

Optionally, the mashed potatoes can be dried at 40 to a solids content in the range of about 20% to 35% by weight.

As a further alternative, the mashed potatoes can be retrograded directly without a pre-drying step.

The potatoes processed as described above are then treated by a retrogradation step 42. The potatoes are retrograded thoroughly so that when used as a binder, the resulting finely ground natural potato material has a sufficiently low viscosity and stickiness or adhesiveness that the binder can be easily distributed throughout the shreds without excessive mixing. The retrograded binder holds the shreds together during subsequent deep-fat frying so that the formed potato patties do not fall apart in the fryer or absorb excess fat during frying. By reducing excessive mixing, breakage of long, fragile shreds can be minimized.

The retrogradation step decreases the amount of water soluble starch present in the potatoes by decreasing the water solubility of the amylose component of the starch. This is believed due to an association of the amylose starch molecules, probably by hydrogen bonding either directly or through molecules of water bridging between active sites on the starch molecules. See Talbert and Smith, *Potato Processing*, 3d ed., AVI. pp. 445-447. By thoroughly retrograding the amylose starch in the potatoes, the amount of water soluble starch per gram of solids present in the potatoes is substantially reduced.

The desired amount of retrogradation is provided by holding the potatoes at temperatures below about 50° F. until the necessary reduction in soluble starch is produced. We have found this is provided by holding the potatoes at a temperature of 50° F. for at least about 16 hours, preferably about 16 to 20 hours; or by holding the potatoes at lower temperatures above freezing for proportionately shorter holding periods; or by freezing the potatoes for even proportionately shorter time intervals. For example, at holding temperatures close to but above freezing (about 32° F.), the required holding time for thorough retrogradation is about 8 to 10 hours. When freezing the binder potatoes, the holding period can be short, i.e., just long enough to freeze the water naturally present in the potatoes. Potatoes that are frozen for about 4 hours are sufficiently retrograded. A binder made from potatoes that have been held in refrigeration at about 50° F. for about 6 to 12 hours is not retrograded to the desired extent because the potatoes have such a high viscosity and are very sticky that it is difficult to mix the binder with the shreds, causing undesirable breakage of the shreds. Potatoes retrograded by refrigeration at about 50° F. from about 12 hours to less than about 16 hours provide marginal results.

After the potatoes have been extensively retrograded, the potatoes can be subdivided by a grinding or mashing step 44, if the potatoes have not already been subdivided previously at steps 22, 26 or 32. The comminuted binder is then added continuously to the previously shredded potatoes in a mixing step 46. It is preferred to mix about 10 to about 50 parts of the binder with about 100 parts of the potato shreds, by weight. The binder and shreds are mixed gently such as in a pug mill or screw conveyor. Alternatively, the discharge of the grinder for the binder can be located directly over the entry point of the shredding apparatus, so the rotary action of the shredder can serve a dual purpose of cutting the sliced potatoes into shreds and mixing the binder into the finished shreds in a single step.

Following mixing of the shreds and binder, the mixture is formed into patties by a forming step 48. One preferred shape of the patty is $2.75 \times 3.75 \times 0.375$ inch. The patties are formed by a device that compresses the mixture to the desired shape while the starch naturally present in the binder is still in its retrograded condition. During the compression step the binder flows into the spaces between the individual shreds, completely filling the interstices. Patties made without the binder have a discontinuous surface which allows oil to penetrate into the center of the patty. During subsequent frying the oil penetrates into the patty and coats the individual shreds, resulting in an undesirable wet and greasy internal appearance. The potato patties prepared with the binder of this invention have well-sealed surfaces with a desirable dry interior and easily discernable shreds. The reduced stickiness of the binder makes it possible to form patties on a commercial production basis using a commercial former with greater output, less sticking, and better-formed products. The Hollymatic 200, a food forming machine manufactured by Hollymatic Corporation, Park Forest, Illinois, is an example of a commercial former that can be used.

The practice of subdividing the cooled or frozen mass of potatoes to form the binder immediately before mixing the binder with the shreds has been found to provide a further improvement in process control. The subdivided potato tissue in its coldest state, i.e., frozen or semi-frozen, has been found to be most easily mixed into the shreds with minimum damage to the fragile, long pieces of cooled potato tissue. Frozen potato slices can be ground to form a fine powder, or pre-ground potato material can be frozen and then mixed with the shreds when semi-frozen. If complete thawing of the binder occurs, sanitation problems can arise and water loss can cause loss of solids and nutrients. There is also a substantial improvement in machinability of the patties provided by use of frozen ground binder. The reduced temperature of the shred/binder mixture allows patties to be extruded with minimal sticking problems in the former.

The formed potato patties can be fried at 50, cooled, and then frozen at 52. The formed patties can be par-fried in a deep-fat fryer maintained at a temperature of about 350° F. to 380° F. for a period of about 1 to 2 minutes. If the potato patties are formed sufficiently thin, say $3 \times 4 \times \frac{3}{8}$ inches, the frozen parfried patty can be reheated in a pop-up toaster or household toaster oven. The parfried hash brown patties also can be prepared by reheating them in an oven maintained at 400° F. for about 10 to 12 minutes. For restaurant use, the formed potato patties can be immediately frozen and packaged. For final preparation, say restaurant preparation, the frozen patties are placed in a deep-fat fryer at a temperature of about 350° F. to 380° F. for about two to four minutes. Parfried patties have an added advantage for restaurant use because preparation time is shorter and the product retains its shape to a greater degree if it is accidentally thawed before being used.

The degree of heat treatment of the potatoes prior to retrogradation is not critical as long as the starch is completely gelatinized. Excellent results have been obtained with either cooked or blanched potatoes.

The degree of cell breakage in preparing the binder does not presently appear to adversely affect use of the binder. Successful binders have been made from cooled, blanched, hammer-milled potatoes; cooked, mashed, refrigerated potatoes; blanched, frozen, hammer-milled potatoes; rehydrated potato flakes, frozen and used either as a thawed mash or hammer-milled while frozen to a snow-like powder. Using a hammer-mill to subdivide cooked potato tissue ruptures substantial quantities of the potato cells, releasing the gelatinized starch.

Comparable results have been obtained using cooked potatoes, i.e., mashed, frozen and thawed, and those frozen in pieces, then hammer-milled or mashed after thawing. Hence, the effect of freezing or cooling is not dependent upon the particle size of the potato.

Results with rehydrated dried potatoes in either piece or instant mashed form have been reasonably similar to those using freshly blanched or cooked potatoes.

The binder material is retrograded to the extent that its resulting low viscosity and low adhesive character are unlike previously known binders used to facilitate forming mixtures of potato shreds into patties. Ordinarily one would suppose that the adhesive character of the binder would be used for holding together the shreds. Previously known potato-based mixtures used as such binders rely on the highly adhesive character of dehydrated potatoes, such as riced potatoes or potato fluor. We have discovered that the reduced viscosity and reduced stickiness of the binder produced by the present process permits the binder to be easily distributed throughout the patty without excessive mixing, thus avoiding appreciable breakage of the fragile shreds. This results in a commercially desirable patty with a significantly large number of intact long, thin shreds, since mixing the non-sticky binder with the fragile shreds does not damage them. Moreover, the binder can be so completely mixed with the shreds that even without being adhesive in nature, it can bind the shreds sufficiently to prevent separation of the patty during deep-fat frying. Since the patties can be deep-fat fried without falling apart in the fryer, preparation time can be substantially reduced when compared with potato patties conventionally fried on a grill one side at a time.

The thoroughly retrograded binder also makes it possible to use a commercial former in extruding patties from the mixture of binder and long, thin shreds. The relatively low viscosity and stickiness of the retrograded binder at the time of forming permits use of a high-speed commercial former on a commercial production basis since residue from the non-adhesive binder does not unduly clog the former.

Further, it has been discovered that the binder at the exterior surface of the patty undergoes a rapid temperature increase at the moment of frying, causing the amylose component of the starch to resolubilize, i.e., rapidly regain its ability to hold water. This forms a continuous film on the exterior surface of the patty which acts as an effective seal against penetration of fat to the interior of the patty. During frying, the internal temperature remains under 100° C. due to the cooling effect of the water being evaporated at the surface. However, a thin molecular film of re-solubilized binder material at the exterior of the patty exceeds the boiling temperature of water due to the rapid heat transfer from the frying fat, normally at about 190° C. This forms a continuous barrier around the exterior of the patty that resists excess fat penetration to the extent that the potato patty has significantly less fat uptake during frying than a comparable potato patty made with a nonretrograded natural potato binder. Fat content of finished deep-fat fried potato patties can be below about 13%.

The thin exterior film not only seals against fat penetration, but also minimizes oil drip in toaster reheated potato patties. Conventional electric pop-up toasters can be used for quick preparation of food products. A frozen, fried potato patty can contain 10% to 20% fat in the form of cooking oil. During heating in a pop-up toaster, the oil can drain from the product and collect in the crumb tray in the bottom of the toaster. Fires have been reported from such overheated oil in toasters. The fat barrier provided by the retrograded binder of this invention minimizes oil drip during toaster preparation to the extent that the frozen potato patty can be safely reheated in conventional pop-up toasters.

Another advantage of the present invention is that by-products from french fry manufacture can be made into binders and shreds for shredded hash brown products. These by-products generally fall into two categories, namely, nubbins and slivers. These are described in more detail in the above-referenced application Ser. No. 871,150, filed Jan. 20, 1978.

The improvement provided by this invention is emphasized further in the following examples.

EXAMPLE 1

This example describes laboratory preparation of potato patties from simulated french fry by-products illustrating use of extended mixing instead of a retrograded binder.

Russet Burbank potatoes were peeled and cut into french fry nubbins, ⅜-inch × ⅜-inch × approximately 2 inches (9.5 × 9.5 × 50.8 mm). The nubbins were water blanched at 180° F. (82° C.) for 20 minutes and cooled in running tap water for 20 minutes. A portion of the nubbins was removed and stored at 40° F. (4.5° C.) for preparation of binder the next day for Example 2. The remaining cooled nubbins were shredded in an Urschel Model CC shredder having a cutting blade suitable to produce shreds approximately 3/16-inch (5 mm) wide and 1/16-inch (1.6 mm) thick. A hand-operated molding die 3⅝ × 2¾ × ½-inches (92 × 70 × 12.7 mm) was used to press patties from the shredded hash browns. It was found that, as made, the shreds would not adhere together. They were placed in a Hobart mixing bowl and mixed with a paddle at 60 r.p.m. until sufficient free starch had been liberated from the shreds so that they would adhere together in a patty form. After 3 minutes mixing, it was possible to form a patty that would hold together when parfried 45 seconds at 360° F. (182° C.). The surface of this product, Sample A, was irregular and non-continuous, indicating that additional mixing was necessary to make the shreds more homogeneous. Samples B, C, D, and E were made in the same manner by extending the mixing to 4, 5, 7, and 10 minutes. Products C, D and E had a smooth surface and adhered well, although they were extremely sticky and difficult to remove from the mold.

After freezing these products, a sample of each was thawed in warm ater and the shreds were carefully separated and examined for size. It was found that in Samples A and B, each 76 gram patty had 3 shreds over ¾-inch (19 mm) long; Samples C, D and E had none. The external appearance of the patties resembled commercial products such as "Tater Tots" and "Tri-Taters" made by randomly chopping precooked potatoes rather than shredding. The products C, D and E would not ordinarily be identified as hash brown potatoes because they contain an insufficient amount of long shreds.

The fat analysis of the parfried samples was as follows:

| Sample | Mix Time (Minutes) | Fat Content Par-Fried Patty | Fat Content Finished Patty | Number of ¾" Long Shreds In One 76 gm. Patty |
|---|---|---|---|---|
| A | 3 | 6.1% | 14.8% | 3 |
| B | 4 | 5.5% | 12.4% | 3 |
| C | 5 | 5.8% | 15.1% | 0 |
| D | 7 | 6.7% | 12.5% | 0 |

-continued

| Sample | Mix Time (Minutes) | Fat Content Par-Fried Patty | Fat Content Finished Patty | Number of ¾" Long Shreds In One 76 gm. Patty |
|---|---|---|---|---|
| E | 10 | 6.2% | 13.0% | 0 |

EXAMPLE 2

This example illustrates laboratory preparation of potato patties from simulated french fry by-products using a refrigerated retrograded binder.

An additional quantity of shreds was prepared the next day from the same potatoes cut into nubbins as described in Example 1. At the same time, the portion of the precooked nubbins prepared in Example 1 and refrigerated for 24 hours was ground through the 0.015 Comitrol head to produce a binding material for these shreds. The binder was added to the shreds in the quantites shown in the following table and mixed for one minute in the Hobart paddle mixer.

| Sample | Shreds (gm) | Binder (gm) | No. of Shreds Longer Than ¾-Inch In One 77 gm Patty | Fat Content of Patties Par-Fried | Finished Fried |
|---|---|---|---|---|---|
| A | 1000 | 50 | 15 | 8.3% | 24.1% |
| B | 1000 | 100 | 9 | 8.1% | 20.1% |
| C | 1000 | 150 | 6 | 6.5% | 17.8% |
| D | 1000 | 200 | 7 | 7.4% | 15.9% |
| E | 1000 | 250 | 14 | 6.9% | 16.5% |
| F | 1000 | 300 | 7 | 6.4% | 13.0% |
| G | 1000 | 500 | 7 | 5.9% | 14.0% |

Hash brown patties were made from the shred-binder mixture, par-fried and frozen as described in Example 1. The next day, samples of each were thawed in warm water and examined for size. The quantity of pieces over ¾-inch (19 mm) long shown in the above table indicates that very little breakage of the long shreds occurred by mixing in the binder and that the internal appearance of these patties was superior to those produced in Example 1. The products of Example 2 were deep fat fried for 2 minutes at 360° F. (182° C.) and examined for quality with the following results:

Samples A and B, in which the ratio of binder to shreds was 5:100 and 10:100 respectively, were not acceptable. The quantity of binder was not sufficient to produce a sealed surface, thus permitting excess oil to penetrate into the binder, producing an unacceptable final appearance.

Samples C, D, E, F and G, in which the ratio of binder to shred was 15:100, 20:100, 25:100, 30:100 and 50:100, respectively, were acceptable, with Samples D and E being preferred for eating quality and appearance. All products could easily be identified as traditionally prepared hash brown potatoes because of the presence of the desirable long shreds.

EXAMPLE 3

This example illustrates laboratory preparation of potato patties in which shreds were prepared from whole small potatoes, illustrating the effect of increased retrogradation of amylose in the binder by holding under refrigeration for increasing periods of time.

Preparation of the Binder

Nubbins were selected from ⅜-inch french fry pieces, blanched at 180° F. (82° C.) for 20 minutes, and cooled for 20 minutes in running tap water. The cooled pieces were held for various periods of time before being ground in the Comitrol grinder using the 0.015-inch head.

Preparation of Shreds

At the intervals shown in the table below, shreds were produced from small whole potatoes commonly known as eliminators. These potatoes were blanched at 180° F. (82° C.) for 30 minutes and cooled in running tap water for 20 minutes. The cooled potatoes were pre-dried to remove surface water in a Proctor & Schwartz through-circulation test dryer operated at 190° F. (88° C.). After 3 minutes, the weight of the pre-dried pieces had decreased 10%. The pre-dried pieces were then shredded in a Model 5A Hobart mixer fitted with a ¼-inch (6.4 mm) shredding disc attachment.

The binder was mixed for one minute with the freshly-prepared shreds at the ratio of 20 parts binder to 100 parts shreds, and formed into oval patties weighing about 95 grams. The patties were parfried at 360° F. (182° C.) for 45 seconds, cooled and frozen. These products were later refried at 340° F. (171° C.) for 2.5 minutes to simulate restaurant preparation. These results are tabulated below:

| Sample | Binder Hold Time (Hours) | Fat Content Par-Fry Oil (%) | Fat Content Finish-Fry Oil (%) | Quality Internal | Quality External |
|---|---|---|---|---|---|
| A | 0 | 8.2 | 13.0 | Wet | Broken |
| B | 4 | 7.1 | 12.0 | — | Rough |
| C | 8 | 9.4 | 12.7 | Sticky | — |
| D | 12 | 7.0 | 10.9 | — | — |
| E | 16 | 6.5 | 11.9 | — | Firm |
| F | 20 | 6.9 | 9.8 | Dry | — |

All products were formed in acceptable patty shape. However, examination of the interior of the fried patties showed that samples A, B, C, and D were wet and sticky due to the presence of excessive unretrograded amylose. Samples E and F were dry, crumbly and highly undesirable.

Patties were formed in laboratory experiments by compressing the mixture of shreds and binder manually with a stainless steel mold of the desired shape. The potato mixture was placed on a wooden surface and compressed into the mold by the action of a hand-operated lever. It was noted that the binders held for 16 hours or 20 hours had lower viscosity and could be mixed into shreds with greater ease, thus resulting in fewer damaged shreds. While forming the patties in samples A, B, C and D, considerable difficulty was experienced removing them from the mold. Samples E and F were more easily formed and released from the mold with noticeably less sticking.

EXAMPLE 4

This example illustrates laboratory preparation of potato patties and the effect of refrigerating the binder after grinding and the effect of pre-drying the patties.

Shreds and binder were prepared as in Example 3. A portion of the blanched, cooled binder potatoes was ground immediately and held 20 hours at 50° F. and then mixed with the shreds to form patties. The control binder was ground after refrigeration as in Example 3. Preparation of the patties was as described in Example 3. For restaurant use it is desirable to have the patties firm after refrying. Portions of the patties from this test were pre-dried at 190° F. to a weight loss of 10% and 20% by weight. All samples were then parfried, frozen and finished fried as described in Example 3. The results were as follows:

| Binder | Ground After Refrigeration | | | Ground Before Refrigeration | |
|---|---|---|---|---|---|
| Samples | A | B | C | D | E |
| Weight loss of patties during predrying, % | 0 | 10 | 20 | 0 | 20 |
| Fat Content, Parfry, % | 5.9 | 5.0 | 3.4 | 6.1 | 4.5 |
| Final % | 14.1[a] | 12.6[b] | 10.8[c] | 15.9[a] | 10.5[c] |

[a] Came apart slightly in fryer, weak structure
[b] Good patty
[c] Very firm

Pre-drying the patties before frying decreased the fat content and increased the rigidity of the final product.

Grinding the binder before refrigeration had no effect, i.e., Samples A and C were similar to Samples D and E.

EXAMPLE 5

Norgold potatoes were peeled, trimmed and cut to ⅜-inch french fry strips. These were blanched 20 minutes at 82° C., cooled for 20 minutes in running cold tap water, and divided into three sub-samples. These samples were held in storage at 35° F., 50° F. and at room temperature, about 70° F.

At different time intervals, portions of the sub-samples were ground through the Comitrol grinder fitted with a 0.015 head. Visual examination and manual manipulation of the ground potato solids provided the easiest, most effective means for measuring the extent of retrogradation. When potatoes that are not yet retrograded are first ground, the mash is very sticky with a long, stringy character. The ground potatoes are also shiny and have a translucent appearance due to the release of starch. The ground potatoes change gradually, but distinctly, as the length of cooling is extended, eventually forming a more particulate, almost dry appearing, mealy white mass with a mashed potato texture which has completely lost the translucent appearance.

Additional sub-samples were held at 30° F. and 0° F. The results of these tests are tabulated below.

PILOT PLANT

The results of the preceding examples provided the basis for conducting further experimentation to define conditions for commercial processing. A pilot plant capable of producing 1200 patties per hour was installed comprising the following operation.

Potatoes were peeled in a standard restaurant-type Hobart abrasion peeler.

The whole potatoes were sliced to approximately ½-inch in a Halide vegetable slicer.

A 60-gallon steam jacketed kettle was fitted with a perforated stainless steel basket for uniformly blanching batches of potatoes up to 50 lbs.

Prior to shredding the potatoes were cooled in stockpots with running water at 45° to 50° F.

Shreds were produced in a Halide vegetable shredder fitted with either a 6 mm or 8 mm wide opening and also in an Urschel Model CC shredder. The Hobart shredding disc with ¼-inch openings used for preliminary laboratory tests was occasionally used for experiments where comparison with earlier results was required.

EXAMPLE 5

| time (hrs) | 0° F. | 30° F. | 35° F. | 50° F. | 70° F. |
|---|---|---|---|---|---|
| 0 | | | | | |
| 2 | | | very sticky high sheen translucent appearance | | |
| 4 | light, mealy, slightly sticky | | | very sticky translucent appearance | very sticky, translucent appearance |
| 6 | | | | | |
| 8 | | dry, mealy, slightly sticky | sticky, but granular | no change | no change |
| 10 | | | fairly dry, mealy, very little sticking | | |
| 12 | | | | | |
| 14 | | | | | |
| 16 | | | | less sticky, losing translucent appearance | drier, more mealy but still very sticky, losing translucent app |
| 18 | | | | | |
| 20 | | | | slightly sticky, mealy | slightly granular, but still sticky |
| 22 | | | | | |
| 24 | | | | only slightly sticky | no change, except turned sour-discarded |

In earlier experiments, either blanched potatoes or manually formed patties had been pre-dried to increase solids content. A decision was made to pre-dry the blanched shreds to about 23.5% solids prior to forming for practical commercial production. A standard procedure was developed for water removal from blanched shreds, loaded ½-inch deep on a perforated stainless tray in a Proctor & Schwartz test drier using through-circulation of ambient air at about 20° C. Drying cooled shreds at elevated temperature increased the stickiness of the shreds.

For preparation of the binder, it was concluded that pre-dried shreds would be the desired choice in commercial operation. To prepare binders for pilot plant runs, the pre-dried shreds frozen at −20° C. were ground in the Comitrol grinder using the 0.015 head, immediately before mixing with the cooled shredded potatoes. During processing in the warm summer months an additional advantage in forming was noted from the reduction in temperature of the mixture when the still frozen snow-like binder was incorporated into the pre-dried shreds. Improvement could also be obtained if the shreds were cooled prior to forming, to reduce stickiness.

The binder was mixed with the shreds in a 10-quart Hobart mixer using a dough hook. Substantially similar results were obtained with 2 minutes, 5 minutes and 10 minutes mixing on Speed #1 at 60 r.p.m.

The mixture of shreds and binder was formed into patties by compressing the loose mixture of binder and shreds into a cavity of the desired size, and depositing the compressed potatoes onto a conveyor for further processing. For pilot plant operation a Hollymatic Model 200 Hamburger Patty former was fitted with a 2¾ inch × 3¾ inch × ⅜ inch Delrin plastic die. Operation at 1200 patties per hour was easily obtained and convenient for subsequent frying, cooling and freezing operations.

For commercial operation, commercial formers manufactured by Idaho Steel Products, Idaho Falls, Idaho, or Wenger Lehara Company, Grand Rapids, Mich., can be used. In any high speed former, the compression and discharge of the patty formed from the mixture of shreds and binder are similar to that achieved with the Hollymatic former.

Formed patties were inspected on a conveyor leading to the fryer. Any misshapen patties were either returned to the feed-through or frozen for conversion to binder for subsequent production.

Extensive pilot plant operation has demonstrated the necessity for uniform frying of the patties. Originally patties were fried horizontally in a typical basket submerged in a batch fryer. However, these showed differences in color between the top surface and the underside. It is known that the accumulation of steam on the underside of a fried surface will retard transfer of heat to the surface and result in an underfried condition. It was found that this condition also contributed to the increased drip of oil from the frozen product when reheated in a common household pop-up toaster. Commercial fryers using an external heat exchanger can easily provide enough movement of fat past both top and bottom surfaces of patties to achieve equal water removal and minimum temperature differential on top and bottom surfaces. A velocity of five times the velocity of the patty of the oil appears to provide uniform frying. A small doughnut fryer Model AF-2 manufactured by Belshaw was modified to produce this rate of oil flow.

Fried patties were cooled by moving ambient air past them and then placed on trays and frozen at −20° C. to −30° C.

Various ungelatinized starches, such as potato starch and corn starch, can be added to the binder to increase the rigidity of the finished patty. However, the cost of the finished product is increased and the fat absorption is generally increased since these ingredients do not contain retrograded amylose.

Thermal gelling binders such as Methocel were considered but rejected due to their expense and the undesirability of such products to the consuming public. However, carbymethylcellulose, a thickening agent has been shown to have use as a release agent. Myvacet, an acetylated monoglyceride known for its function as a release agent, yielded no significant improvement.

A test method was developed to determine whether patties made by these pilot plant techiques would reduce normal fat drip into pop-up toaster crumb trays during toaster preparation. According to this method, the frozen fried product was placed in a G.E. Model AT786 pop-up toaster after the toaster had been preheated for one minute. A pre-weighed piece of aluminum foil was placed in the crumb tray. After 4 minutes on "High" setting the patty has reached an internal temperature of approximately 90° C. Aluminum foil was removed and weighed to determine the amount of fat lost by the potato patty. The results showed a loss of fat less than about 200 mg per 60 gram patty.

EXAMPLE 6

The effect of frying temperature on oil drip from potato patties was tested. Hash brown patties were prepared as in Example 7, Sample A, below. The binder was prepared from shreds pre-dried to a weight loss of 15%. These shreds were frozen, and ground in the Comitrol to form the binder immediately before mixing with shreds to form patties. The patties were removed from the Hollymatic former and fried in separate batches, oriented vertically in the restaurant fryer basket. Samples were fried for 60 seconds at temperatures increasing from 177° C. to 202° C. These samples were frozen and later analyzed for fat content; color, by visual comparison with the Potato Chip Institute color grading chart; and for oil drip during a four minute toaster preparation. The results are as follows:

| Effect of Fry Temperature, 60 Seconds Fry Time | | | |
| --- | --- | --- | --- |
| Sample | Temperature (°C.) | Color (PCI) | Fat, % | Oil Drip, mg |
| A | 177 | 5 | 7.9 | 606 |
| B | 183 | 5 | 7.6 | 586 |
| C | 193 | 7.5 | 9.6 | 449 |
| D | 202 | 9 | 9.7 | 356 |

At 177° C. and 183° C. color development was minimum, oil content of the patties was low, 7.6% and 7.9%. However, the fat drip was high, 606 milligrams and 586 milligrams per patty, respectively.

When the frying temperature was increased to 193° C. and 202° C. the fat content increased to 9.6% and 9.7%, but the oil drip per patty decreased significantly to 449 and 356 milligrams, respectively. At the same time the color increased sharply to 7.5 and 9 on the same scale. The additional browning of the surface is an indication of the increased temperature to which the surface had been heated during frying. The conclusion reached is that the outer surface of the patty had reached a temperature high enough to resolubilize the amylose, creating a continuous film around the surface of the patty as exhibited by the fact that the patties were browned more than the samples fried for the same time at lower temperatures. The film formed at the surface of the patty limits the fat absorbed during frying and helps contain the fat during toaster reheating.

EXAMPLE 7

Pilot plant evaluation of various binders was conducted. Shredded potatoes were prepared as described in Example 1 from Russet Burbank potatoes with a solids content of 19.9% by weight. The shreds were dried with ambient air at 20° C. circulated through the bed at a velocity of about 300 feet per minute, providing a weight loss of 15% and increasing the solids content to about 23.5%. In this drying step approximately two pounds of shreds were spread in a layer ½-inch deep on the perforated stainless tray from the Proctor & Schwartz experimental tray dryer and weighed periodically until the loss in moisture reached the desired level. Approximately 5 minutes were required in this experiment. Six portions of these shreds were prepared and mixed with binders as follows:

Sample A. Shreds made as described above were frozen at −20° C. for about 24 hours, then ground through a Comitrol grinder with a 0.015 screen. 600 grams of the ground material were blended with 18 grams of dextrose and 18 grams of salt, using a Hobart A-5 mixer with a paddle at 60 r.p.m. for one minute.

200 grams of this binder mixture was mixed with 1021 grams of pre-dried shreds using a dough hook in a larger Hobart mixer on low speed for 2 minutes.

The mixture of shreds and binder was manually fed into the hopper of the Hollymatic patty former. During production of the patties, the adhesiveness or stickiness of the surfaces was noted. An estimate was made of the number of patties that could be made before the machine needed to be shut down due to sticking of the patties to the former. The mixture of Sample A was rated the least adhesive of the series and it was estimated that the patty former could have operated continuously for several hours on this material.

The patties were arranged vertically in a wire basket with supporting wire screens and fried for one minute in palm oil at 190° C. The patties were then cooled and frozen on metal trays in a walk-in freezer maintained at −20° C.

Later, the patties were evaluated for appearance, fat content and fat drip during toasting. The appearance was judged on a 5 point scale in which a score of 5 is very good, 1 is very bad.

Sample B. A portion of the same raw potatoes was peeled, sliced and cooked in a steamer until well done. These potatoes were manually riced through a 4 mm opening, spread in a thin layer on a perforated stainless steel tray, and dried with ambient air at 21° C. until a weight loss of 15% had been obtained, as in Examle A. The partially dehydrated mashed potato was retrograded by holding it in the refrigerator in a closed container for 20 hours at 4° C. and then used in a binder for shreds in a potato patty as in Sample A.

Sample C. A second portion of the same potatoes was cooked and prepared similar to the binder in Sample B, but these potatoes were used immediately after pre-drying without retrogradation by holding under refrigeration.

During the formation of the patties in Sample B, some sticking of the patties to the forming mechanism was noted after about 30 patties had been formed. It was concluded that although the former could not be operated almost indefinitely as with Sample A, with only minimal down time, difficulty would be experienced for Sample B after another 20 or 30 patties had been formed, or a total of 50 or 60 patties. With Sample C, however, the patties stuck firmly to the forming mechanism after 25 patties had been formed, and the run had to be terminated.

Sample D. A dehydrated riced potato binder was prepared as described in U.S. Pat. No. 3,410,702 to Frank. Sliced, peeled potatoes were cooked in steam until done, pressed through a 4 mm opening and spread in a thin layer on a dryer tray. The product was dehydrated at 90° C. initially and finally at 60° C. to a moisture content of about 7.0%. This binder was prepared by mixing 50 grams of the dried potatoes with 150 grams of boiling water to produce a solids content of approximately 23.5%. The binder was allowed to cool for about 60 minutes to room temperature before using. This binder was extremely adhesive and was mixed into the shreds only with difficulty following the same procedure as Sample A. Only 15 patties were formed before the machine had to be stopped. The patties thus formed were mostly misshapen due to their tendency to stick to the moving parts of the forming apparatus and to the edges of the wire supports in the fryer.

Sample E. Results similar to Sample D were obtained with a binder prepared from dehydrated mashed potato flakes. Normal retail potato flakes were reconstituted with water at 175° F. and allowed to cool 60 minutes to room temperature, as described for Sample D. This binder was the most adhesive of the series and produced poor results in forming similar to Sample D.

Sample F. A portion of the potato shreds was formed into patties without adding any binder. These shreds were mixed in the Hobart with the dough hook for an additional period of 3 minutes, or 5 minutes total, to create sufficient free starch to bind the patties together, as in Example 1. The additional mixing disintegrated portions of the shreds and produced a mixture resembling that of Sample C. The length of the shreds in this product was noticeably.

Results of the evaluation of this test are tabulated below. The beneficial results obtained from using a potato binder with starch that has been internally retrograded is demonstrated by comparing the evaluations of Samples A and B with those of the other binders. Not only did the fried patties have better shape, but they contained less absorbed fat and had produced substantially less fat drip during toaster reheating.

EXAMPLE 8

This example illustrates use of frozen reconstituted mash as a binder. Additional samples of potato flakes reconstituted as described in Example 7. Sample E, were spread on a tray and frozen. After 24 hours a portion of these flakes was removed and ground in the Comitrol to form a binder. A second portion was allowed to thaw approximately 30 minutes to a temperature of 2° C. and was then used directly as a binder without grinding. These binders were mixed into shreds prepared as in Example 7. Good results were obtained that were substantially similar to a control sample made with frozen pre-dried shreds as in Sample A.

EXAMPLE 9

This example illustrates the effect of frying condition on surface treatments. An experiment was performed to illustrate the need for uniform heat-treatment of each side of the preformed patty to resolubilize the retrograded amylose. Samples of patties and frozen ground binder were prepared as described in Example 7, Sample A. Portions of these patties were fried in a restaurant-size electrically heated deep-fat fryer maintained at 190° C. A flip-flop device constructed of wire mesh was used to support six patties so they could be turned over while submerged in the fat.

Sample A. Six patties were placed in the basket and fried 60 seconds in the horizontal position. The top was noticeably darker than the bottom side of these patties.

Sample B. A portion of the same patties were fried while held at a 45° angle under the same conditions. These patties were more uniform in color.

Sample C. A portion of the same patties were fried vertically using wire supports for the patties. These patties were identical in color on both sides.

Sample D. Patties were fried horizontally for 30 seconds on one side and then turned over for an additional 30 seconds on the second side while remaining submerged in fat.

Sample E. Patties were fried similar to Sample D, except they were turned twice during frying.

Sample F. Patties were fried similar to Sample E, except they were turned three times during frying.

The samples were frozen and later evaluated for color, fat content and oil drip. A significant reduction in oil drip can be attributed to the improved uniformity of frying accomplished by holding the patties vertically, or turning them frequently if held flat.

In later experiments, patties fried horizontally as in Sample A were sliced carefully in half while frozen to separate the top section from the bottom section. The halved patties were supported vertically and heated with a 250-watt infrared lamp to simulate toaster preparation. Toaster drip for the browned upper sides averaged 198 milligrams; from the underfried section the toaster drip was 373 milligrams. This again illustrates the need for uniform frying of both surfaces of the patty to achieve resolubilization of the retrograded amylose contained in the binder. Results of this example are tabulated below.

EXAMPLE 7

| SAMPLE | A | B | C | D | E | F |
|---|---|---|---|---|---|---|
| Top | 8 | 8 | 7 | 7 | 6.5 | 6 |
| Bottom | 6 | 8 | 7 | 7 | 7 | 6 |
| % Fat | 8.4 | 9.7 | 8.0 | 8.5 | 8.0 | 7.6 |
| Oil Drip | 137 | 21 | 15 | 100 | 5 | 3 |
|  | 156 | 84 | 2 | 165 | 70 | 7 |
| Average: | 147 | 53 | 9 | 133 | 37 | 5 |

(a) 30 + 30 seconds
(b) 20 + 20 + 20 seconds
(c) 15 + 15 + 15 + 15 seconds
(d) Potato Chip Institute Color Guide Thus, the present invention provides a natural potato binder in which the amylose component of the gelatinized starch naturally present in the potato binder is retrograded to reduce its solubility to the extent that the adhesiveness of the binder is minimized, which allows the binder to be mixed completely with shreds to form a patty that holds together sufficiently to permit deep-fat frying while the reduced viscosity and stickiness of the binder also serves as an extrusion aid in forming the patties. In addition to providing minimal damage to the long shreds during forming and later during frying, the pre-retrograded amylose becomes resolubilized for forming an exterior fat barrier that not only reduces fat penetration but also reaches fat drip during subsequent toaster preparation.

What is claimed is:

1. A process for preparing a formed potato product capable of being deep-fat fried, comprising the steps of:
   (1) preparing potato shreds;
   (2) preparing a natural potato binder by heat-treating potatoes to gelatinize the starch naturally present in the potatoes, holding the heat-treated potatoes at a temperature of about 50° F. for at least about 16 hours, or at a lower temperature above freezing for a proportionately shorter holding time but for at least about 8 hours, or at a potato freezing temperature, so that the starch naturally present in the potato cells is extensively retrograded, and finely dividing the retrograded potatoes to rupture the potato cells and release the gelatinized starch naturally present in the potato cells, thereby producing a finely divided natural potato binder in which the gelatinized starch released from the potato cells has

|  |  | SAMPLE |  |  |  |  |
|---|---|---|---|---|---|---|
|  | A | B | C | D | E | F |
|  |  | COOKED RICED POTATOES Pre-dried 15% |  | DRIED POTATO BINDERS |  |  |
| BINDER | FROZEN GROUND SHREDS | Held 20 hours @ 4° C. | Used Immediately | L. J. Frank Process | Potato Flakes | NONE |
| BINDER SOLIDS, % | 23.4 | 23.4 | 23.4 | 23.5 | 23.5 | — |
| PATTY OBSERVATIONS (a) |  |  |  |  |  |  |
| Adhesive | 6 | 5 | 4 | 2 | 1 | 3 |
| Forming (b) | 2400+ | 50+ | 25 | 15 | 15 | 25 |
| Evaluation Fried Product (c) |  |  |  |  |  |  |
| Surface | 4 | 3 | 2 | 2 | 2 | 2 |
| Edge grade | 4 | 3 | 2 | 1 | 2 | 2 |
| Shape | 4 | 3 | 2 | 2 | 2 | 2 |
| Total Score | 12 | 9 | 6 | 5 | 6 | 6 |
| Fat Content, % | 12.0 | 12.5 | 14.7 | 13.5 | 14.3 | 14.0 |
| Fat Drip During Toasting, mg. | 142 | 151 | 490 | 990 | 499 | 746 |

(a) Ranked in order, 1 is most - 6 is least
(b) Estimate of number of patties that could be made before former stopped
(c) Rated on 1 to 5 scale; 5 very good, 1 very bad

EXAMPLE 9

| SAMPLE | A | B | C | D | E | F |
|---|---|---|---|---|---|---|
| Frying: |  |  |  |  |  |  |
| Position | Flat | 45° | Vertical | Flat | Flat | Flat |
| Turned, times | 0 | 0 | 0 | 1 | 2 | 3 |
| Total Fry Time, sec | 60 | 60 | 60 | 60 (a) | 60 (b) | 60 (c) |
| Color: (d) |  |  |  |  |  |  | been retrograded sufficiently to form a non-sticky natural potato binder; and then (3) mixing the potato shreds with the natural potato binder to form a potato patty capable of being deep-fat fried.

2. The process according to claim 1 including deep-fat frying the potato patty to form a hash brown potato product.

3. The process according to claim 1 including mixing the potato binder with the shreds while the binder is in a frozen or semi-frozen state.

4. The method according to claim 1 in which the potatoes used in preparing the binder have a solids content of about 20% to about 35% by weight throughout the retrograding step, and in which the binder has a solids content of about 20% to about 35% by weight when mixed with the shreds.

5. The process according to claim 1 including preparing the binder from dehydrated potatoes to which water is added to provide a solids content of about 20% to about 35% by weight, and in which the potatoes are extensively retrograded at said solids content.

6. The process according to claim 1 including forming the potato patty by extruding the mixture of binder and shreds.

7. The process according to claim 1 including frying the potato patty to form a hash brown potato product which is capable of being reheated in a toaster to an internal temperature of about 90° C. with a loss of less than about 200 mg of fat per 60 gram patty.

8. The process according to claim 1 including the step of partially drying the shreds to increase their solids content prior to mixing the shreds with the binder.

9. The process according to claim 1 including the step of mixing about 10 to about 50 parts of the binder with 100 parts of the shreds.

10. The process according to claim 1 including the step of partially drying the heat-treated potatoes to increase their solids content prior to retrograding the potatoes.

11. A process for preparing a hash brown potato product, comprising:
heat-treating potatoes to gelatinize the starch naturally present in the potatoes;
retrograding the heat-treated potatoes by holding them at a temperature of about 50° F. for at least about 16 hours, or at a lower temperature above freezing for a proportionately shorter holding time but for at least about 8 hours, or at a potato freezing temperature;
grinding the retrograded potatoes to rupture the potato cells and release the retrograded starch naturally present in the potato cells and thereby produce a natural potato binder of finely divided ground potatoes and water, the binder having a solids content from about 20% to about 35% by weight, wherein the released retrograded starch reduces the viscosity and adhesiveness of the binder;
preparing potato shreds; and then
mixing the potato shreds with said natural potato binder to form a potato patty capable of being deep-fat fried.

12. The method according to claim 11 including deep-fat frying the potato patty to form a hash brown potato product.

13. The process according to claim 11 including forming the potato patty by extruding the mixture of potato shreds and binder.

14. The method according to claim 11 including mixing the potato binder with the shreds while the binder is in a frozen or semi-frozen state.

15. The process according to claim 11 in which the potatoes have a solids content of about 20% to about 35% by weight during the retrograding step.

16. The process according to claim 11 in which the potato patty is fried to form a hash brown potato product which is capable of being reheated in a toaster to an internal temperature of about 90° C. with a loss of less than about 200 mg of fat per 60 gram patty.

17. The process according to claim 11 including the step of partially drying the shreds to increase their solids content prior to mixing the shreds with the binder.

18. The process according to claim 11 including the step of mixing about 10 to about 50 parts of the binder with 100 parts of the shreds.

19. The process according to claim 11 including the step of partially drying the heat-treated potatoes to increase their solids content prior to retrograding the potatoes.

20. A process for preparing a formed potato product capable of being deep-fat fried, comprising the steps of:
preparing potato shreds;
preparing a natural potato binder, of finely divided potato solids and water, having a solids content from about 20% to about 35% by weight, the binder being prepared from potatoes by the steps of heat-treating potatoes to gelatinize the starch naturally present in the potatoes, holding the heat-treated potatoes at a temperature below about 50° F. for at least about 16 hours, or at a lower temperature above freezing for a proportionately shorter holding time but for at least about 8 hours, or at a potato freezing temperature, to extensively retrograde the gelatinized starch naturally present in the potato cells, and grinding the retrograded potatoes to rupture the potato cells and release the starch naturally present in the potato cells thereby producing a natural potato binder containing extensively retrograded starch released from the potato cells for greatly reducing the stickiness of the binder;
mixing the potato shreds with the natural potato binder to form a patty; and then
frying the patty and freezing the fried patty to form a frozen hash brown potato product capable of being reheated in a toaster to an internal temperature of about 90° C. with a loss of less than about 200 mg of fat per 60 gram patty.

21. The process according to claim 20 in which the potatoes are ground while in a frozen or semi-frozen state.

22. The process according to claim 21 in which the potatoes have a solids content of about 20% to about 35% by weight during the retrograding step.

23. The process according to claim 20 including the step of partially drying the shreds to increase their solids content prior to mixing the shreds with the binder.

24. The process according to claim 20 including the step of mixing about 10 to about 50 parts of the binder with 100 parts of the shreds.

25. The process according to claim 20 including the step of partially drying the heat-treated potatoes to increase their solids content prior to retrograding the potatoes.

26. A process for preparing a formed potato product capable of being deep-fat fried, comprising the steps of:
(1) preparing potato shreds;
(2) preparing a natural potato binder by heat-treating potatoes to gelatinize the starch naturally present in the potatoes, finely dividing the heat-treated potatoes to rupture the potato cells and release the gelatinized starch naturally present in the potato cells, and holding the finely divided potatoes at a temperature of about 50° F. for at least about 16 hours, or at a lower temperature above freezing for a proportionately shorter holding time but for at least about 8 hours, or at a potato freezing temperature, so that the starch naturally present in the potato cells is extensively retrograded, thereby producing a finely divided natural potato binder in which the gelatinized starch released from the potato cells has been retrograded sufficiently to form a non-sticky natural potato binder; and then
(3) mixing the potato shreds with the natural potato binder to from a potato patty capable of being deep-fat fried.

27. The process according to claim 26 in which the formed potato patty is fried to form a hash brown potato product which is capable of being reheated in a toaster to an internal temperature of about 90° C. with a loss of less than about 200 mg of fat per 60 gram patty.

28. The process according to claim 26 in which the potatoes have a solids content of about 20% to about 35% by weight during the retrograding step.

29. The process according to claim 26 including the step of partially drying the shreds to increase their solids content prior to mixing the shreds with the binder.

30. The process according to claim 26 including the step of partially drying the heat-treated potatoes to increase their solids content prior to finely dividing and retrograding the potatoes.

* * * * *

UNITED STATES PATENT AND TRADEMARK OFFICE
CERTIFICATE OF CORRECTION

PATENT NO. : 4,419,375

DATED : December 6, 1983

INVENTOR(S) : MILES J. WILLARD AND WILLIAM J. ENGLAR

Page 1 of 2

It is certified that error appears in the above-identified patent and that said Letters Patent is hereby corrected as shown below:

Column 1, line 42-43, "shedded" should read --shredded--.
Column 1, line 12, "french" should read --French--; line 15, "comercially" should read --commercially--; Column 4, line 10, "increases" should read --increase--. Column 5, line 15, "AVI." should read --AVI,--. Column 6, line 32, "50" should read --50 [boldface]--; line 33, "52" should read --52 [boldface]--. Column 8, line 4, "french" should read --French--; line 15, "french" should read --French--; line 19, "french" should read--French--; line 48, "ater" should read --water--. Column 9, line 12, "french" should read --French--. Column 10, line 3, "french should read --French--. Column 11, line 53, "french" should read --French--. Column 12, line 16, "Halide" should read --Hallde--; line 22, "Halide" should read --Hallde--; line 63, "temperature" should read --temperatures. Column 13, line 33, "through" should read --trough--; line 51, "of" should read --in--; line 59, "corn starch" should read -cornstarch--. Column 16, line 32 "noticeably." should read --noticeably reduced.--. Column 17, line 4, "were" should read --was--; line 7, "were" should read --was--. Column 18, line 26, "reaches" should read --reduces--.

UNITED STATES PATENT AND TRADEMARK OFFICE
CERTIFICATE OF CORRECTION

PATENT NO. : 4,419,375

DATED : December 6, 1983

INVENTOR(S) : MILES J. WILLARD AND WILLIAM J. ENGLAR

It is certified that error appears in the above-identified patent and that said Letters Patent is hereby corrected as shown below:

In the claims, Column 22, line 4, claim 26, "from" should read --form--.

Signed and Sealed this

Twenty-second Day of October 1985

[SEAL]

Attest:

DONALD J. QUIGG

Attesting Officer

Commissioner of Patents and Trademarks—Designate